US012469655B2

(12) United States Patent
Horiuchi et al.

(10) Patent No.: US 12,469,655 B2
(45) Date of Patent: Nov. 11, 2025

(54) KEY STRUCTURE

(71) Applicant: CHICONY ELECTRONICS CO., LTD., New Taipei (TW)

(72) Inventors: Mitsuo Horiuchi, New Taipei (TW); Chia-Hsin Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 170 days.

(21) Appl. No.: 18/310,987

(22) Filed: May 2, 2023

(65) Prior Publication Data

US 2023/0420198 A1 Dec. 28, 2023

(30) Foreign Application Priority Data

Jun. 24, 2022 (TW) .................................. 111123763

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC ........ H01H 13/14; H01H 13/20; H01H 13/10; H01H 3/125; H01H 13/705; H01H 13/86; H01H 13/7065; H01H 3/12
USPC ................................ 200/520, 341, 344, 345
See application file for complete search history.

(56) References Cited

U.S. PATENT DOCUMENTS 10,236,138 B2 * 3/2019 Chen ...................... H01H 13/14
2003/0188961 A1 10/2003 Obara et al.
2013/0140162 A1 * 6/2013 Lu .......................... H01H 3/125 200/344

FOREIGN PATENT DOCUMENTS

CN 106935422 A 7/2017

* cited by examiner

*Primary Examiner* — Lheiren Mae A Caroc
(74) *Attorney, Agent, or Firm* — MUNCY, GEISSLER, OLDS & LOWE, P.C.

(57) ABSTRACT

A key structure includes a base plate, a keycap, a connecting assembly, a protrusion and a limiting member. The connecting assembly includes a first frame and a second frame pivotally connected to each other. Two opposite ends of the first frame are movably connected to the base plate and the keycap, respectively, and two opposite ends of the second frame are movably connected to the base plate and the keycap, respectively, to drive the keycap upward and downward relative to the base plate. The protrusion is disposed on a sidewall of the first frame or a sidewall of the second frame. The limiting member corresponds in position to the protrusion. When the keycap is at a maximum height, the protrusion abuts against the limiting member.

13 Claims, 8 Drawing Sheets

KEY STRUCTURE

BACKGROUND

1. Technical Field

The present disclosure relates to a key structure.

2. Description of the Related Art

At present, from the perspective of computer usage habit, keyboards are indispensable input devices. With computers and computer peripherals being designed to be increasingly lighter, thinner, and smaller, keyboards were downsized, resulting in the emergence of thin keyboards.

FIG. 1A is a side view of a conventional key structure 9 with conventional strokes. As shown in FIG. 1A, the key structure 9 has a scissor-type connector 91 for connecting a keycap 92 and a base plate 93 to drive the keycap 92 upward and downward relative to the base plate 93. The scissor-type connector 91 comprises an outer frame 911 and an inner frame 912 pivotally connected to each other. Conventionally, the outer frame 911 has one end movably disposed on a bottom side of the keycap 92 and the other end confined to a hook 931 of the base plate 93. Likewise, the inner frame 912 has one end pivotally connected to the bottom side of the keycap 92 and the other end movably disposed at another hook 932 of the base plate 93. Thus, the outer frame 911 and the inner frame 912 have a pivotal connection end and a moving end, respectively. When the keycap 92 is pressed, the moving ends move away from the keycap 92 and drive the keycap 92 toward the base plate 93 in the direction indicated by the dashed lines in FIG. 1A. When an applied force ceases, the keycap 92 is restored to its initial height. Therefore, the height of the keycap 92 is reduced by reducing the stroke of the keycap 92.

FIG. 1B is a side view of a conventional key structure 9*a* with short strokes. As shown in FIG. 1B, the horizontal displacement of the moving end of an inner frame 912*a* is reduced by increasing the distance from the base plate 93*a* to two hooks 931*a*, 932*a*. After the key structure 9*a* has been restored to its initial height, the horizontal displacement of the inner frame 912*a* is shortened (compared with the distance between the hooks 931, 932 in FIG. 1A and the distance between the hooks 931*a*, 932*a* in FIG. 1B); thus, the vertical displacement of a keycap 92*a* is restricted, thereby reducing the height of the keycap 92*a* (when the keycap 92*a* is not pressed.)

However, the position of the hook 932*a* must be precise in order to restrict the displacement of the moving end of the inner frame 912*a*. Thus, the allowable tolerance range of the position of the hook 932*a* becomes extremely narrow, and in consequence tolerance control becomes difficult.

SUMMARY

In view of the aforesaid drawbacks of the prior art, it is an objective of the disclosure to provide a key structure comprising a protrusion and a limiting member and thereby effectively control the tolerances of a conventional key structure with short strokes.

To achieve the above and other objectives, the disclosure provides a key structure comprising a base plate, a keycap, a connecting assembly, a protrusion and a limiting member. The connecting assembly comprises a first frame and a second frame pivotally connected to each other. Two opposite ends of the first frame are movably connected to the base plate and the keycap, respectively, and two opposite ends of the second frame are movably connected to the base plate and the keycap, respectively, to drive the keycap upward and downward relative to the base plate. The protrusion is disposed on a sidewall of the first frame or a sidewall of the second frame. The limiting member corresponds in position to the protrusion. When the keycap is at a maximum height, the protrusion abuts against the limiting member.

According to an embodiment of the disclosure, when the keycap is pressed, the protrusion does not abut against the limiting member.

According to an embodiment of the disclosure, a curved portion facing the keycap is defined on a side of the protrusion and abuts against the limiting member.

According to an embodiment of the disclosure, the limiting member is disposed at the base plate and extends from the base plate toward the keycap.

According to an embodiment of the disclosure, the limiting member has a curved inner wall, and the protrusion abuts against curved inner wall.

According to an embodiment of the disclosure, the limiting member has a curved outer wall disposed located on a side of the limiting member and positioned proximate to the keycap.

According to an embodiment of the disclosure, the base plate comprises an opening. The opening is adjacent to the limiting member.

According to an embodiment of the disclosure, the first frame has an extension portion extending from a bottom side of the first frame toward the base plate. The protrusion is disposed on an outer sidewall of the first frame and adjacent to the extension portion.

According to an embodiment of the disclosure, the first frame has a recess. The recess is disposed on an outer sidewall. The protrusion is adjacent to the recess. The recess is formed above the protrusion.

According to an embodiment of the disclosure, the protrusion has an oblique bottom surface.

According to an embodiment of the disclosure, the protrusion is disposed on an inner sidewall of the second frame.

According to an embodiment of the disclosure, the protrusion is positioned proximate to an upper surface of the second frame.

According to an embodiment of the disclosure, the protrusion is disposed on an inner sidewall of the first frame. The limiting member is disposed on an outer sidewall of the second frame and is a limiting groove, the protrusion is movably disposed in the limiting groove.

According to an embodiment of the disclosure, the limiting member has a closed end and an open end. The closed end is positioned proximate to an upper surface of the second frame. The open end is disposed on a lower surface of the second frame.

According to an embodiment of the disclosure, the protrusion is disposed on an outer sidewall of the second frame, with the limiting member disposed on an inner sidewall of the first frame and being a limiting groove, the protrusion is movably disposed in the limiting groove.

According to an embodiment of the disclosure, the first frame comprises a pivotal hole, and the second frame comprises a pivotal axle disposed in the pivotal hole. The protrusion is spaced apart from the pivotal axle or the pivotal hole.

In continuation of the description above, the key structure of the disclosure comprises a base plate, a keycap, a connecting assembly, a protrusion and a limiting member. The connecting assembly comprises a first frame and a second frame pivotally connected to each other to drive the keycap upward and downward relative to the base plate. The protrusion is disposed on the sidewall of the first frame or the second frame and corresponds in position to the limiting member to restrict the maximum height of the keycap and thereby facilitate the operation of a key structure with short strokes. The aforesaid design dispenses with the need to restrict the position of the hooks of the base plate and thereby effectively controls the tolerances of a conventional key structure with short strokes.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 2A:
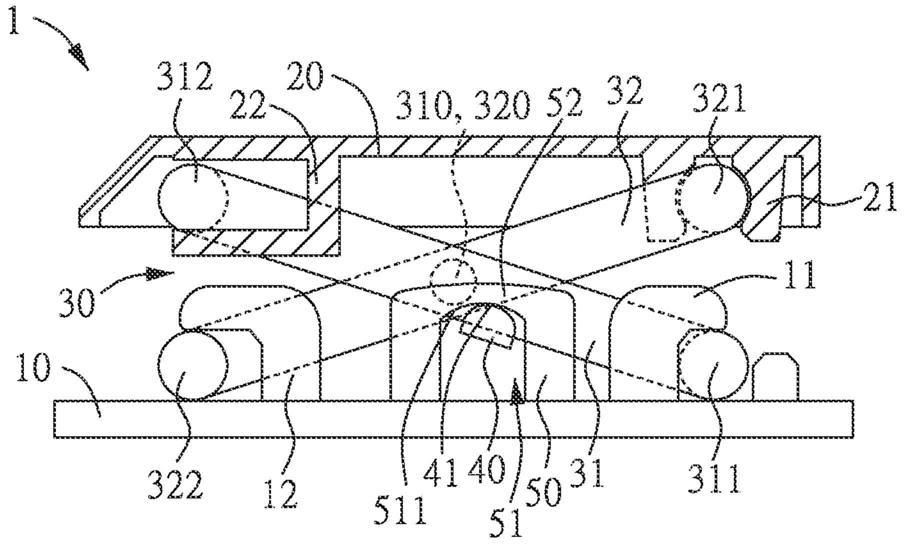
FIG. 2A is a side view of a key structure according to a first embodiment of the disclosure.
Figure 2B:
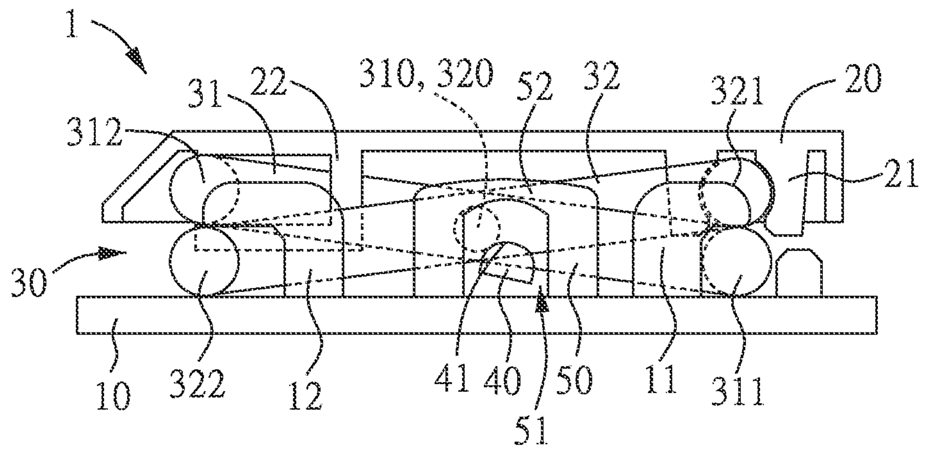
FIG. 2B is a schematic view of the key structure shown in FIG. 2A being pressed.
Figure 3:
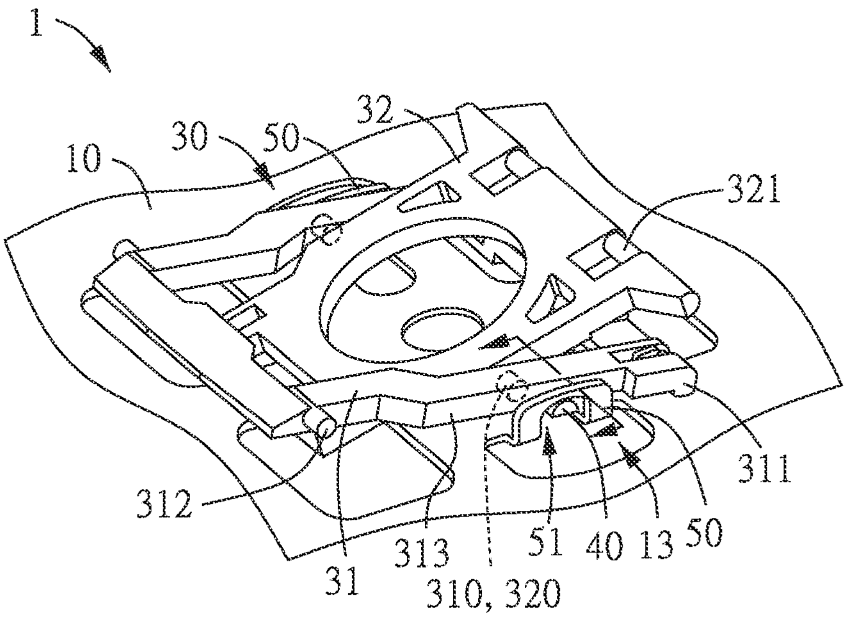
FIG. 3 is a perspective view of a base plate and a connecting assembly shown in FIG. 2A.

FIG. 2A is a side view of a key structure according to a first embodiment of the disclosure. FIG. 2B is a schematic view of the key structure shown in FIG. 2A being pressed. FIG. 3 is a perspective view of a base plate and a connecting assembly shown in FIG. 2A. The first embodiment of the disclosure is described below with reference to FIG. 2A, FIG. 2B and FIG. 3. In this embodiment, a key structure 1 comprises a base plate 10, a keycap 20, a connecting assembly 30, a protrusion 40 and a limiting member 50. The connecting assembly 30 connects the keycap 20 and the base plate 10. In this embodiment, the connecting assembly 30 is a scissor-type connector and comprises a first frame 31 and a second frame 32 pivotally connected to each other. Two opposite ends of the first frame 31 are movably connected to the base plate 10 and the keycap 20, respectively, and two opposite ends of the second frame 32 are movably connected to the base plate 10 and the keycap 20, respectively, so as for the connecting assembly 30 to drive the keycap 20 upward and downward relative to the base plate 10.

The base plate 10 has at least two hooks 11, 12. The bottom side of the keycap 20 has a pivotal connection portion 21 and a sliding groove 22. Two ends of the first frame 31 are a pivotal connection end 311 and a moving end 312, respectively. The pivotal connection end 311 is connected to the hook 11 of the base plate 10. The moving end 312 is disposed in the sliding groove 22 of the keycap 20. The base plate 10 further has a stop structure for confining the pivotal connection end 311 of the first frame 31 to between the hook 11 and the stop structure. Likewise, two opposite ends of the second frame 32 are a pivotal connection end 321 and a moving end 322, respectively. The pivotal connection end 321 is connected to the pivotal connection portion 21 of the keycap 20. The moving end 322 is disposed at the hook 12 of the base plate 10. When the keycap 20 is pressed, the pivotal connection ends 311, 321 of the first frame 31 and the second frame 32 rotate inside the hook 11 and the pivotal connection portion 21, respectively; thus, the moving ends 312, 322 of the first frame 31 and the second frame 32 are subjected to limitations from the hook 12 and the sliding groove 22 and thus move horizontally away from the keycap 20 to guide the keycap 20 moving vertically toward the base plate 10, as shown in FIG. 2B.

In this embodiment, the protrusion 40 is disposed on a sidewall of the first frame 31. Preferably, in this embodiment, the first frame 31 is an outer frame, and the second frame 32 is an inner frame. The protrusion is disposed on an outer sidewall 313 of the first frame 31, as shown in FIG. 3. The limiting member 50 corresponds in position to the protrusion 40. In this embodiment, the limiting member 50 is disposed on the base plate 10, extended from the base plate 10 toward the keycap 20, and is adjacent to the protrusion 40. Thus, in this embodiment, the limiting member 50 is a hook extending upward from the base plate 10. The limiting member 50 has a accommodated space; in this embodiment, the accommodated space is a limiting hole 51. The limiting hole 51 corresponds in position to the protrusion 40 so that the protrusion 40 can be disposed in the accommodated space (i.e., the limiting hole 51).

When the keycap 20 is at a maximum height (i.e., when the keycap 20 restored to its initial height or the keycap 20 not being pressed) as shown in FIG. 2A, the protrusion 40 abuts against the limiting member 50. In this embodiment, the protrusion 40 abuts against the inner wall of the limiting hole 51. Preferably, a curved portion 41 facing the keycap 20 is defined on one side of the protrusion 40. Thus, the curved portion 41 is defined on the upper side of the protrusion 40. When the keycap 20 is not pressed and restored to its initial height, the curved portion 41 of the protrusion 40 abuts against the inner wall of the limiting hole 51.

Figure 1A:
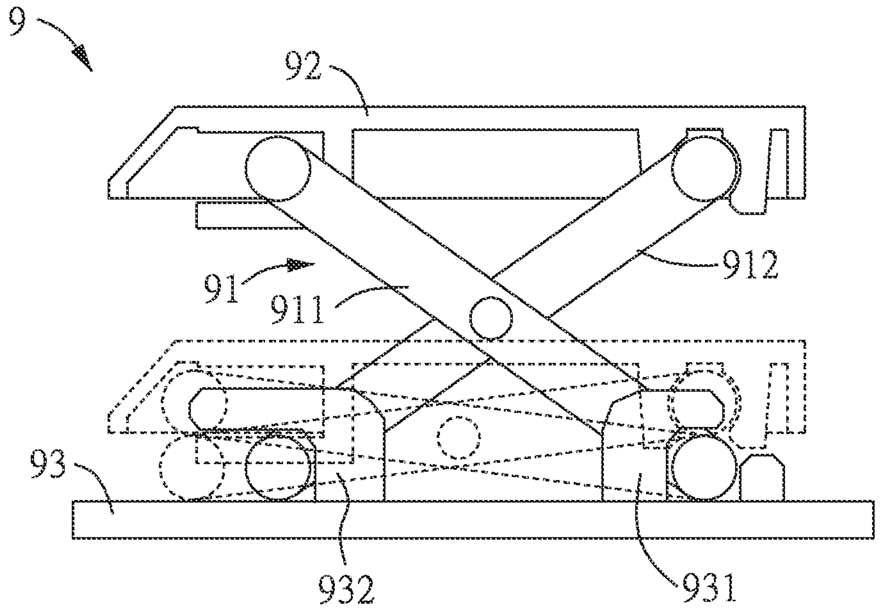
FIG. 1A (PRIOR ART)
FIG. 1A (PRIOR) is a side view of a conventional key structure with conventional strokes.
Figure 1B:
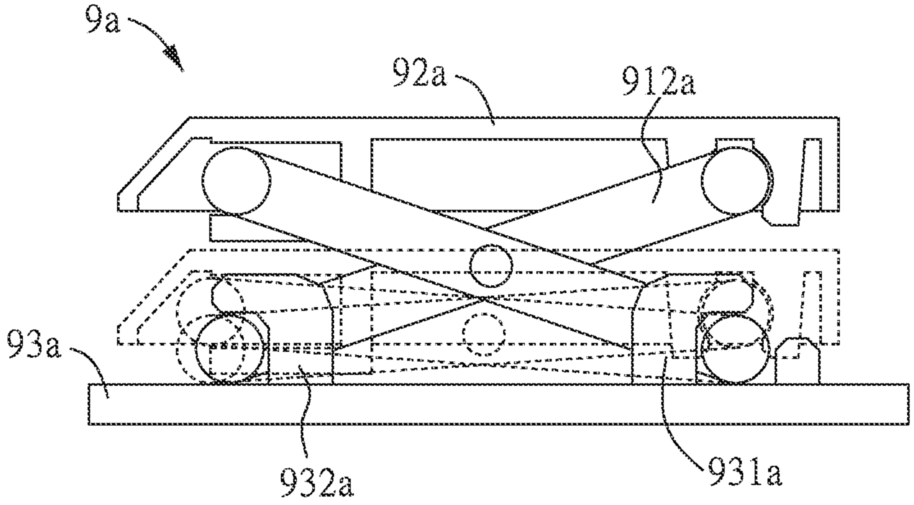
FIG. 1B (PRIOR ART)
FIG. 1B (PRIOR) is a side view of a conventional key structure with short strokes.

When the keycap 20 is pressed, the protrusion 40 moves downward and thus does not come into contact with the limiting member (i.e., the protrusion 40 does not abut against the limiting member 50). If the keycap 20 is restored to its initial height when no longer pressed, the protrusion 40 abuts against the inner wall of the limiting hole 51. Therefore, the position at which the protrusion 40 and the limiting member 50 abut against each other is determined according to the requirement for a stroke or the height of the keycap 20. Thus, in this embodiment, the protrusion 40 is disposed at the first frame 31 and corresponds in position to the limiting member 50 to control the height of the keycap 20, thereby forming the key structure 1 with short strokes. The aforesaid design dispenses with the need to restrict the position of the hook 12 and thereby effectively controls the tolerances of the key structure 9*a* (as shown in FIG. 1B) with short strokes.

Figure 4:
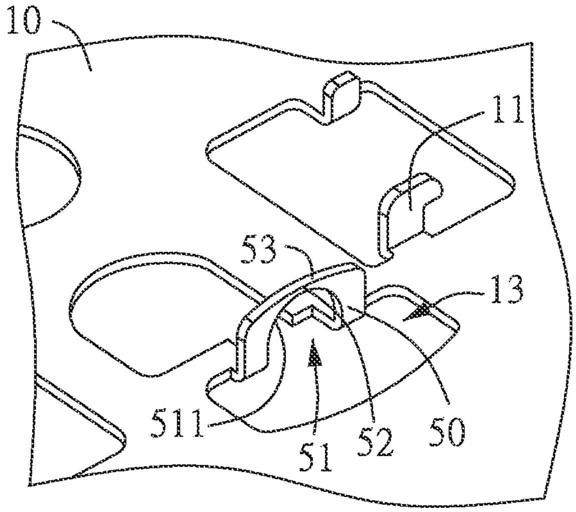
FIG. 4 is a partial enlarged schematic view of the base plate shown in FIG. 3.

FIG. 4 is a partial enlarged schematic view of the base plate shown in FIG. 3. Referring to FIG. 2A and FIG. 4, preferably, the limiting member 50 has a curved inner wall 511 located on one side of the limiting hole 51 and positioned proximate to the keycap 20 so that the limiting hole 51 takes on the shape of an arch. In other words, the curved inner wall 511 lies above the limiting hole 51. When the keycap 20 is not pressed, the curved portion 41 of the protrusion 40 abuts against the curved inner wall 511; meanwhile, the keycap 20 is at the maximum height. The thickness of an upper transverse portion 52 of the limiting member 50 to increase gradually from its middle to its two ends to form the curved inner wall 511, thereby reinforcing the limiting member 50. The protrusion 40 hits the curved inner wall 511 as soon as the keycap 20 is restored to its initial height. If the two ends of the upper transverse portion 52 are as thin as the middle of the upper transverse portion 52, the upper transverse portion 52 will deform as a result of frequent impacts from the protrusion 40. The curved inner wall 511 precludes the impact-induced deformation of the upper transverse portion 52.

Preferably, the limiting member 50 further has a curved outer wall 53 (see FIG. 4) disposed on one side of the limiting member 50 and positioned proximate to the keycap 20. That is, both the inner and outer sides the upper transverse portion 52 are curved, with its inner side being the curved inner wall 511, and its outer side being the curved outer wall 53. In some embodiments, when the keycap 20 is pressed, its bottom side comes into contact with the outer side (i.e., the curved outer wall 53) of the upper transverse portion 52 of the limiting member 50, leading to a need to design a corresponding avoidance structure. If the outer side of the upper transverse portion 52 is the curved outer wall 53, it will be only necessary for the bottom side of the keycap 20 to have a curved recess corresponding to the curved outer wall 53. By contrast, in a situation where the outer side of the upper transverse portion 52 is of a square structure, it will be more difficult in the alignment of the square structure. To solve the problem, it has to increase the width of the avoidance structure on the bottom side of the keycap 20, and it affects the smoothness of key stroke.

Figure 5A:
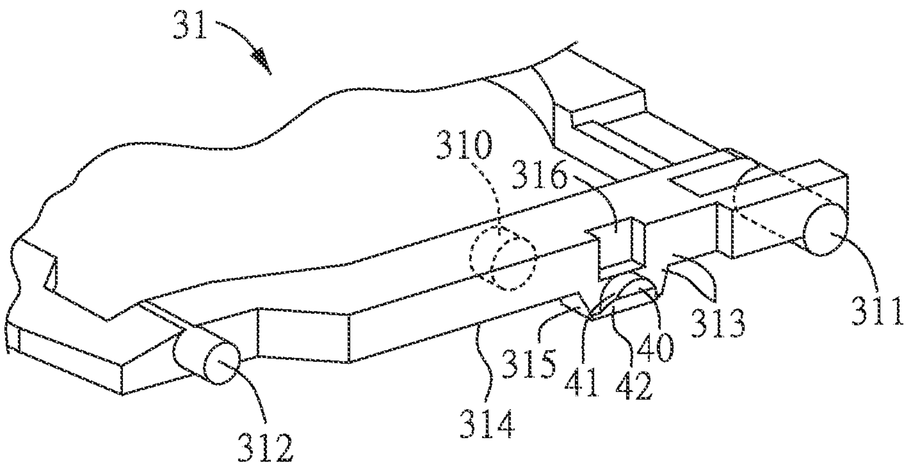
FIG. 5A is a partial enlarged schematic view of a first frame shown in FIG. 3.

Preferably, the base plate 10 further comprises an opening 13. The opening 13 is adjacent to the limiting member 50. As shown in FIG. 3 and FIG. 4, the opening 13 is disposed under the limiting member 50. The opening 13 enables the protrusion 40 to be disposed near a bottom side 314 of the first frame 31 (as shown in FIG. 5A). FIG. 5A is a partial enlarged schematic view of the first frame shown in FIG. 3. Referring to FIG. 3 and FIG. 5A, in this embodiment, the first frame 31 has an extension portion 315. The extension portion 315 extends from the bottom side 314 of the first frame 31 toward the base plate 10. In this embodiment, the extension portion 315 is a protrusion structure disposed on the bottom side 314 of the first frame 31 and extended downward. Further, the protrusion 40 is disposed on an outer sidewall 313 of the extension portion 315 and thus positioned proximate to the bottom side 314 of the first frame 31, as shown in FIG. 5A. The protrusion 40 moves in the direction of the base plate 10 as soon as the keycap 20 is pressed, but its downward movement is not hindered by the base plate 10 because of the presence of the opening 13.

Figure 5B:
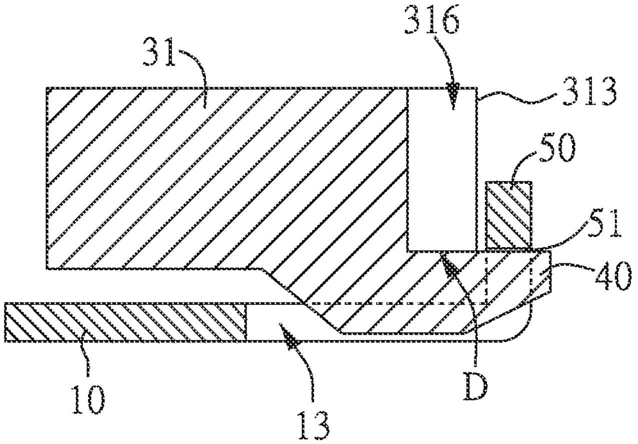
FIG. 5B is a cross-sectional view of portions of the first frame, a protrusion and a limiting member shown in FIG. 3.

Preferably, the first frame 31 has a recess 316. The recess 316 is disposed on the outer sidewall 313 and above the extension portion 315, and thus the protrusion 40 is adjacent to the recess 316. FIG. 5B is a cross-sectional view of portions of the first frame, a protrusion and a limiting member shown in FIG. 3. As shown in FIG. 5B, the recess 316 precludes a stress concentration and thereby enhances the durability of the first frame 31 and the protrusion 40. Should the recess 316 is absent, stress will concentrate on the outer sidewall 313 (i.e., the position attained by filling up the recess 316) above the protrusion 40 whenever the protrusion abuts against the inner wall of the limiting hole 51. Therefore, the recess 316 is formed above the protrusion 40, and the bottom surface of the recess 316 connects to the top surface of the protrusion 40 to enable the protrusion and the recess 316 to jointly form a stress-dispersing structure D, i.e., the distance from a point of contact between the protrusion 40 and the inner wall of the limiting hole 51 to the sidewall of the recess 316 (i.e., the bottom side of the recess 316). The aforesaid distance is greater than a distance from the point of contact between the protrusion 40 and the inner wall of the limiting hole 51 to the outer sidewall 313 in the absence of the recess 316. The extension of the aforesaid distance is effective in preventing a stress concentration. Furthermore, during an assembly process, the recess 316 protects the protrusion 40 against severance or damage which might otherwise occur when the protrusion 40 presses downward against the limiting member 50.

As shown in FIG. 5A, preferably, the protrusion 40 has an oblique bottom surface 42. The oblique bottom surface 42 connects to the extension portion 315 of the first frame 31. Thus, the oblique bottom surface 42 is located below the protrusion 40. The oblique bottom surface 42 renders it easy to mount the connecting assembly 30 on the base plate 10. Moreover, during the assembly process, the oblique bottom surface 42 functions as a guide surface for use in mounting the protrusion 40 on the limiting member 50 and protecting the protrusion 40 or the limiting member 50 against damage which might otherwise occur as a result of interference from the assembly process.

As disclosed above, the first frame 31 and the second frame 32 are pivotally connected to each other. In this embodiment, the first frame 31 comprises a pivotal hole 310, and the second frame 32 comprises a pivotal axle 320 disposed in the pivotal hole 310, as thereby shown in exactly the same position in FIG. 2A, FIG. 2B and FIG. 3. The first frame 31 and the second frame 32 are pivotally connected to each other by the pivotal hole 310 and the pivotal axle 320. Preferably, the protrusion 40 is spaced apart from the pivotal axle 320 or the pivotal hole 310. As shown in FIG. 5A, in this embodiment, the protrusion 40 is spaced apart from the pivotal hole 310 and disposed between the pivotal hole 310 and the pivotal connection end 311. In this embodiment, after the connecting assembly 30 has been mounted on the base plate 10, the pivotal connection end 311 is lower than the pivotal hole 310.

Figure 6:
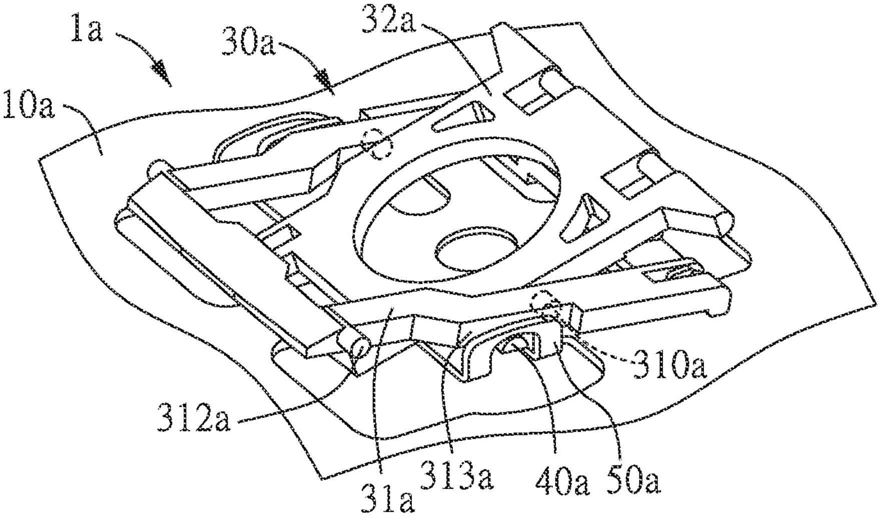
FIG. 6 is a perspective view of a key structure according to a second embodiment of the disclosure.
Figure 7:
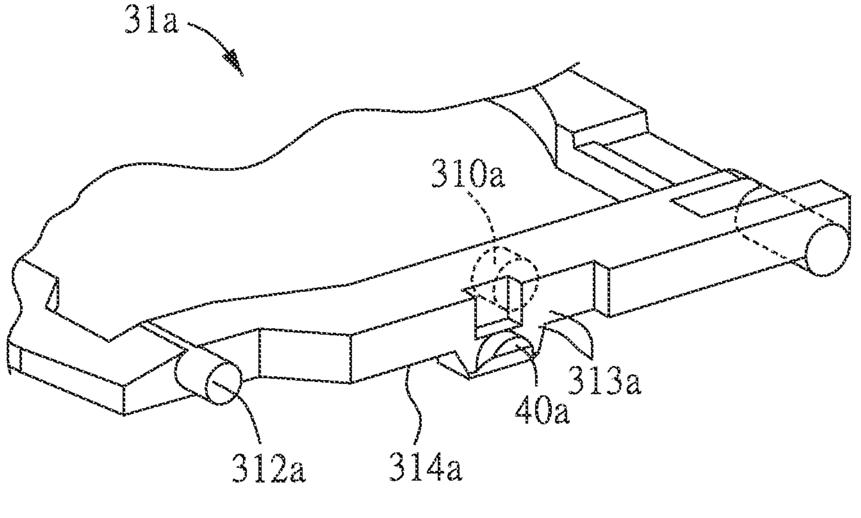
FIG. 7 is a partial enlarged schematic view of the first frame shown in FIG. 6.

FIG. 6 is a perspective view of a key structure 1*a* according to a second embodiment of the disclosure. FIG. 7 is a partial enlarged schematic view of a first frame 31*a* shown in FIG. 6. Referring to FIG. 6 and FIG. 7, in the second embodiment, likewise, the key structure 1*a* comprises a base plate 10*a*, a keycap, a connecting assembly 30*a*, a protrusion 40*a* and a limiting member 50*a*. For the sake of conciseness, FIG. 6 shows the key structure 1*a* but not any keycap like the keycap 20 shown in FIG. 2A and FIG. 2B. Likewise, the connecting assembly 30*a* comprises the first frame 31*a* and the second frame 32*a*, with the first frame 31*a* being an outer frame, and the second frame 32*a* being an inner frame. In this embodiment, likewise, the protrusion 40*a* is disposed on an outer sidewall 313*a* of the first frame 31*a* and positioned proximate to a bottom side

314*a*. The limiting member 50*a* is disposed on the base plate 10*a* and corresponds in position to the protrusion 40*a*.

Unlike the key structure 1 of the first embodiment, the protrusion 40*a* of the second embodiment is disposed between a moving end 312*a* and a pivotal hole 310*a* of the first frame 31*a*. In the second embodiment, after the connecting assembly 30*a* has been mounted on the base plate 10*a*, the protrusion 40*a* is higher than the pivotal hole 310*a*. Therefore, the height attained by the keycap restored to its initial height in the second embodiment is lower than that in the first embodiment, thereby facilitating the operation of the key structure 1*a* with super-short strokes.

The connective relationships between the base plate 10*a*, the connecting assembly 30*a*, the protrusion 40*a* and the limiting member 50*a* and other structures thereof are described in the first embodiment and thus are, for the sake of brevity, not described again below.

Figure 8:
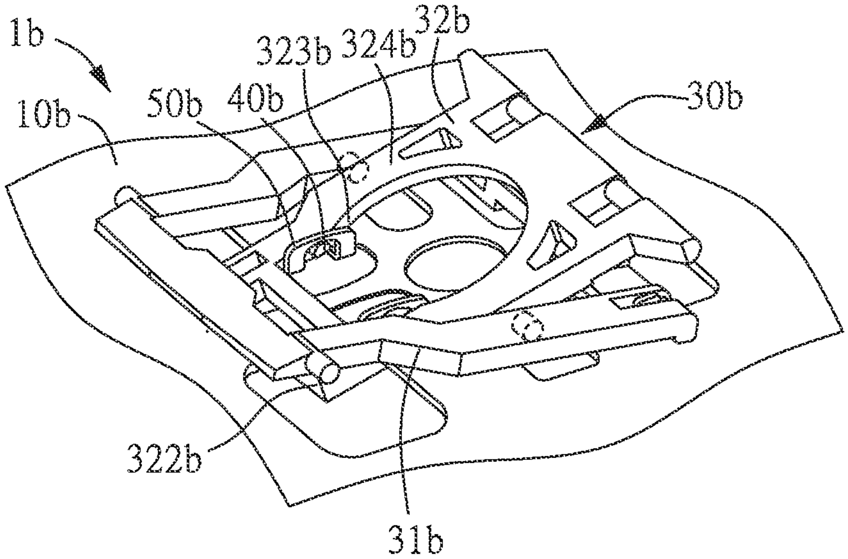
FIG. 8 is a perspective view of a key structure according to a third embodiment of the disclosure.

FIG. 8 is a perspective view of a key structure 1*b* according to a third embodiment of the disclosure. Referring to FIG. 8, in the third embodiment, likewise, the key structure 1*b* comprises a base plate 10*b*, a keycap, a connecting assembly 30*b*, a protrusion 40*b* and a limiting member 50*b*. Likewise, for the sake of conciseness, FIG. 8 shows the key structure 1*b* without the keycap, which can be referred to the keycap 20 shown in FIG. 2A and FIG. 2B. In the third embodiment, the connecting assembly 30*b* comprises a first frame 31*b* and a second frame 32*b*, with the first frame 31*b* being an outer frame, and the second frame 32*b* being an inner frame.

The key structure 1*b* of the third embodiment is distinguished from the key structures 1, 1*a*, of the first and second embodiments by technical features described below. In the third embodiment, the protrusion is disposed on a sidewall of the second frame 32*b* of the connecting assembly 30*b*. The protrusion 40*b* is disposed on an inner sidewall 323*b* of the second frame 32*b*. Preferably, the protrusion 40*b* is not only positioned proximate to a moving end 322*b* but also positioned proximate to an upper surface 324*b* of the second frame 32*b*. When the keycap is not pressed, the protrusion 40*b* abuts against the limiting member 50*b* to restrict the maximum height of the keycap, thereby facilitating the operation of the key structure 1*b* with short strokes.

Figure 9:
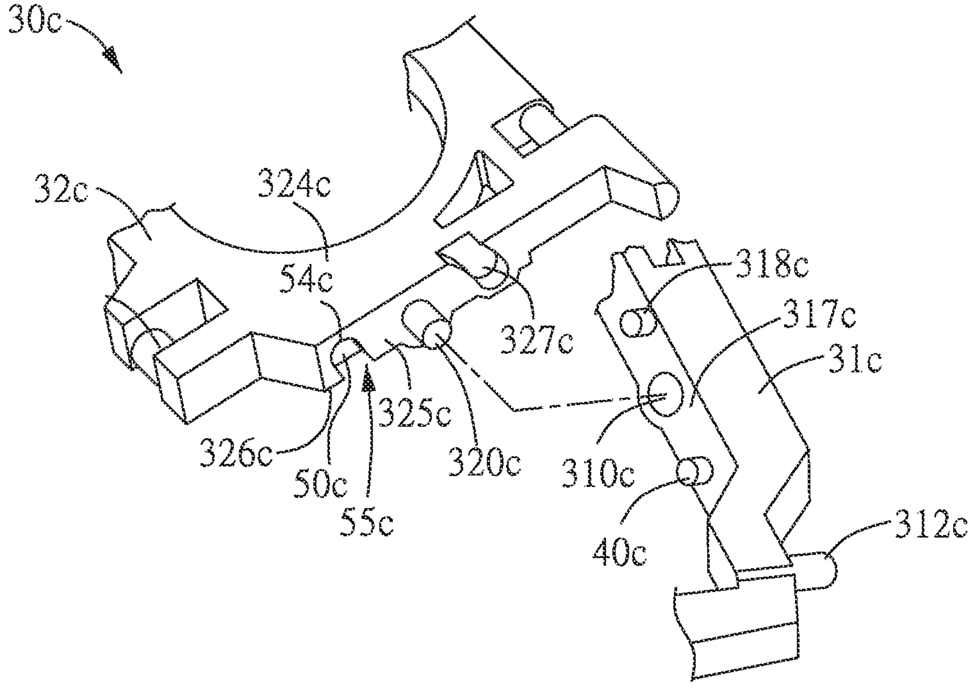
FIG. 9 is a partial enlarged schematic view of a connecting assembly according to a fourth embodiment of the disclosure.

FIG. 9 is a partial enlarged schematic view of a connecting assembly 30*c* according to a fourth embodiment of the disclosure. Referring to FIG. 9, in this embodiment, likewise, the connecting assembly comprises a first frame 31*c* and a second frame 32*c* so that a protrusion and a limiting member 50*c* are disposed on two respective sidewalls of the first frame 31*c* and the second frame 32*c*, respectively. In this embodiment, the first frame 31*c* is an outer frame, and the second frame 32*c* is an inner frame. The protrusion 40*c* is disposed on an inner sidewall 317*c* of the first frame 31*c*, and the limiting member 50*c* is disposed on an outer sidewall 325*c* of the second frame 32*c*. In this embodiment, the limiting member 50*c* is an accommodated space (i.e., limiting groove), and thus the protrusion 40*c* is movably disposed in the limiting groove (i.e., the limiting member 50*c*).

Figure 10A:
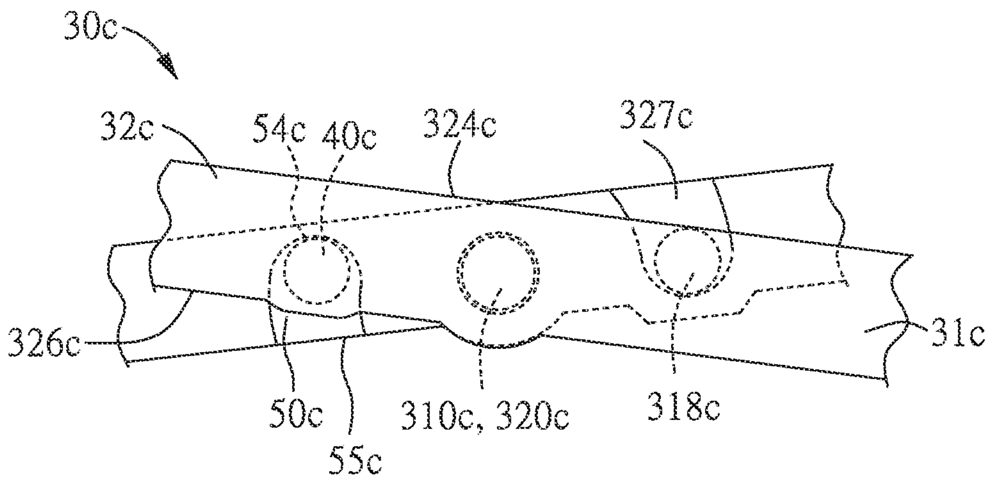
FIG. 10A and FIG. 10B are schematic views of actuation of the connecting assembly shown in FIG. 9.
Figure 10B:
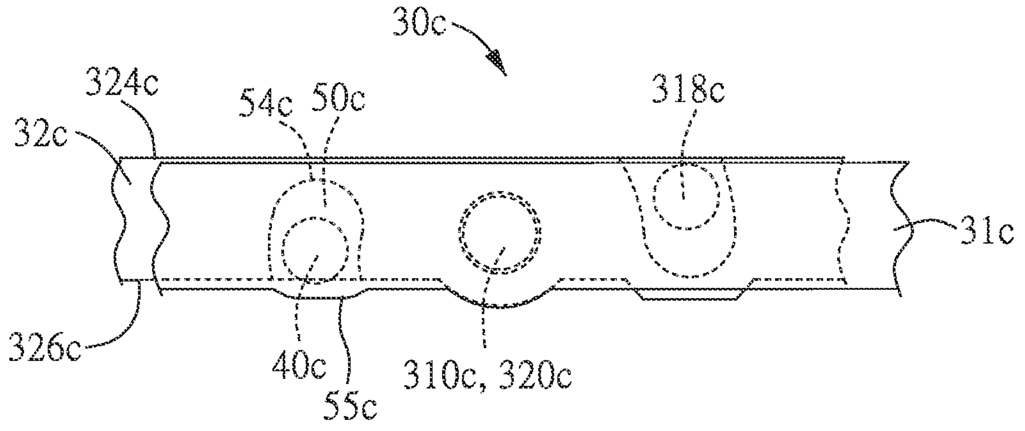

In this embodiment, the limiting member 50*c* has a closed end 54*c* and an open end 55*c*. The closed end 54*c* is positioned proximate to an upper surface 324*c* of the second frame 32*c*. The open end 55*c* is disposed on a lower surface 326*c* of the second frame 32*c*. FIG. 10A and FIG. 10B are schematic views of actuation of the connecting assembly shown in FIG. 9. Referring to FIG. 10A and FIG. 10B, the protrusion 40*c* moves together with the first frame 31*c* in the direction of the open end 55*c* as soon as the keycap (see FIG. 2A and FIG. 2B) is pressed, as shown in FIG. 10B. Upon the cessation of a force otherwise applied to the keycap, the protrusion 40*c* moves reversely to abut against the closed end 54*c* so that the keycap is at a maximum height, as shown in FIG. 10A. Therefore, in this embodiment, likewise, the protrusion 40*c* and the limiting member 50*c* are effective in restricting the maximum height of the keycap to facilitate the operation of a key structure with short strokes.

In this embodiment, the first frame 31*c* comprises a pivotal hole 310*c*, and the second frame 32*c* comprises a pivotal axle 320*c* disposed in the pivotal hole 310*c*. Preferably, in this embodiment, the protrusion 40*b* is spaced apart from the pivotal hole 310*c*, and the protrusion 40*c* is disposed between the pivotal hole 310*c* and a moving end 312*c*. Preferably, the first frame 31*c* further has a guide protrusion 318*c*. The guide protrusion 318*c* and the protrusion 40*c* flank the pivotal hole 310*c* and thus are symmetric to each other. The second frame 32*c* further comprises a guide groove 327*c*. The guide groove 327*c* and the limiting member (i.e., limiting groove) 50*c* flank the pivotal axle 320*c*. The open end of the guide groove 327*c* is disposed on the upper surface 324*c*. The closed end is positioned proximate to the lower surface 326*c*. The guide protrusion 318*c* is received in the guide groove 327*c* and adapted to ensure the smooth movement of the connecting assembly 30*c*.

In another embodiment, the protrusion 40*c* is disposed on the outer sidewall 325*c* of the second frame 32*c*, and the limiting member 50*c* is disposed on the inner sidewall 317*c* of the first frame 31*c*. The protrusion 40*c* is movably disposed in the limiting member (i.e., limiting groove) 50*c* to restrict the maximum height of the keycap.

In conclusion, a key structure of the disclosure comprises a base plate, a keycap, a connecting assembly, a protrusion and a limiting member. The connecting assembly comprises a first frame and a second frame pivotally connected to each other to drive the keycap upward and downward relative to the base plate. The protrusion is disposed on a sidewall of the first frame or second frame, and the limiting member corresponds in position to the protrusion, to restrict the maximum height of the keycap, thereby facilitating the operation of a key structure with short strokes. The aforesaid design dispenses with the need to restrict positions of hooks of the base plate and thereby effectively controls the tolerances of a key structure with short strokes.

It is noted that the above-described embodiments are merely illustrative of preferred embodiments of the disclosure, and that in order to prevent redundancy, not all possible combinations of the variations are described in detail; various changes and modifications may be made to the described embodiments without departing from the scope of the disclosure as described by the appended claims.

What is claimed is:

1. A key structure, comprising:

a base plate;

a keycap;

a connecting assembly comprising a first frame and a second frame pivotally connected to each other, the first frame having two opposite ends movably connected to the base plate and the keycap, respectively, and the second frame having two opposite ends movably connected to the base plate and the keycap, respectively, to drive the keycap upward and downward relative to the base plate;

a protrusion disposed on a sidewall of the first frame or a sidewall of the second frame; and a limiting member disposed at the base plate and extending from the base plate toward the keycap and having a limiting hole, the protrusion being disposed in the limiting hole, wherein the protrusion abuts against the limiting member when the keycap is at a maximum height, and the maximum height is restricted by an upper side of the protrusion abutting against an inner wall of the limiting hole;

wherein the protrusion does not abut against the limiting member when the keycap is pressed.

2. The key structure of claim 1, wherein a curved portion facing the keycap is defined on a side of the protrusion and abuts against the limiting member.

3. The key structure of claim 1, wherein the limiting member has a curved inner wall, and the protrusion abuts against the curved inner wall.

4. The key structure of claim 1, wherein the limiting member has a curved outer wall disposed on a side of the limiting member and positioned proximate to the keycap.

5. The key structure of claim 1, wherein the base plate comprises an opening adjacent to the limiting member.

6. The key structure of claim 1, wherein the first frame has an extension portion extending from a bottom side of the first frame toward the base plate, with the protrusion disposed on an outer sidewall of the first frame and adjacent to the extension portion.

7. The key structure of claim 6, wherein the first frame has a recess disposed on the outer sidewall, being adjacent to the protrusion, and formed above the protrusion.

8. The key structure of claim 1, wherein the protrusion has an oblique bottom surface.

9. The key structure of claim 1, wherein the protrusion is disposed on an inner sidewall of the second frame.

10. The key structure of claim 9, wherein the protrusion is positioned proximate to an upper surface of the second frame.

11. The key structure of claim 1, wherein the first frame comprises a pivotal hole, and the second frame comprises a pivotal axle disposed in the pivotal hole, with the protrusion spaced apart from the pivotal axle or the pivotal hole.

12. A key structure, comprising:

a base plate;

a keycap;

a connecting assembly comprising a first frame and a second frame pivotally connected to each other, the first frame comprising a pivotal hole, and the second frame comprising a pivotal axle disposed in the pivotal hole, the first frame having two opposite ends movably connected to the base plate and the keycap, respectively, and the second frame having two opposite ends movably connected to the base plate and the keycap, respectively, to drive the keycap upward and downward relative to the base plate;

a protrusion disposed on an inner sidewall of the first frame and spaced apart from the pivotal hole; and a limiting member disposed on an outer sidewall of the second frame and being a limiting groove, the protrusion is movably disposed in the limiting groove, wherein the protrusion abuts against the limiting member when the keycap is at a maximum height, wherein the protrusion does not abut against the limiting member when the keycap is pressed.

13. The key structure of claim 12, wherein the limiting member has a closed end and an open end, the closed end being positioned proximate to an upper surface of the second frame, and the open end being disposed on a lower surface of the second frame.

* * * * *